United States Patent
Michelis et al.

(10) Patent No.: US 10,479,400 B2
(45) Date of Patent: Nov. 19, 2019

(54) USE OF THE POWER STEERING TO COMPENSATE FOR THE NEGATIVE EFFECTS INTRODUCED BY A LIMITED SLIP DIFFERENTIAL

(71) Applicant: JTEKT EUROPE, Irigny (FR)

(72) Inventors: André Michelis, Chonas l'Amballan (FR); Fabrice Nobili, Vanosc (FR)

(73) Assignee: JTEKT EUROPE, Irigny (FR)

( * ) Notice: Subject to any disclaimer, the term of this patent is extended or adjusted under 35 U.S.C. 154(b) by 48 days.

(21) Appl. No.: 15/576,782

(22) PCT Filed: Jun. 7, 2016

(86) PCT No.: PCT/FR2016/051356
§ 371 (c)(1),
(2) Date: Nov. 24, 2017

(87) PCT Pub. No.: WO2016/198779
PCT Pub. Date: Dec. 15, 2016

(65) Prior Publication Data
US 2018/0304917 A1    Oct. 25, 2018

(30) Foreign Application Priority Data
Jun. 8, 2015    (FR) ...................................... 15 55187

(51) Int. Cl.
*B62D 5/04*    (2006.01)
(52) U.S. Cl.
CPC .................................. *B62D 5/0472* (2013.01)
(58) Field of Classification Search
CPC ................................................... B62D 5/0472
See application file for complete search history.

(56) References Cited

U.S. PATENT DOCUMENTS

| | | | |
|---|---|---|---|
| 2005/0283290 A1* | 12/2005 | Krimmel | B60W 10/16 701/41 |
| 2008/0217099 A1* | 9/2008 | Reungwetwattana | B62D 5/0472 180/446 |

(Continued)

FOREIGN PATENT DOCUMENTS

| | | |
|---|---|---|
| DE | 103 45 484 A1 | 4/2005 |
| DE | 10 2004 004729 A1 | 9/2005 |

(Continued)

OTHER PUBLICATIONS

Oct. 10, 2016 Search Report issued in International Patent Application No. PCT/FR2016/051356.

*Primary Examiner* — Alex C Dunn
(74) *Attorney, Agent, or Firm* — Oliff PLC (57) ABSTRACT

A power steering device for an axle assembly provided with a limited-slip differential designed to transmit a drive torque to a first and second wheel and to automatically activate, in the event of a loss of synchronism and/or of grip of one of the first and second wheels, an operating mode referred to as "lockup mode" in which differential transfers most of the driving torque to the slower of the first and second wheels, the power steering also including a steering mechanism and a power steering motor controlled by a control module, steering control module containing compensation laws which allow the power steering motor to compensate for certain effects, such as alternating load backup or freezing, induced in the steering mechanism by activation of the differential lockup mode, so as to give the driver a feel close to that of an axle assembly that does not have a lockup mode.

7 Claims, 2 Drawing Sheets

(56) References Cited

U.S. PATENT DOCUMENTS

| | | | | |
|---|---|---|---|---|
| 2008/0262678 A1* | 10/2008 | Nishimura | ............ | B62D 5/0472 701/42 |
| 2009/0105907 A1* | 4/2009 | Yamaguchi | ............ | B62D 5/008 701/41 |
| 2010/0126795 A1* | 5/2010 | Tokunaga | ............ | B62D 5/0472 180/446 |
| 2012/0271516 A1* | 10/2012 | Takahashi | ............ | B62D 5/0466 701/42 |
| 2015/0066305 A1* | 3/2015 | Kodera | ................ | B62D 5/0472 701/43 |
| 2015/0066306 A1* | 3/2015 | Kodera | ................ | B62D 5/0466 701/43 |

FOREIGN PATENT DOCUMENTS

| | | |
|---|---|---|
| DE | 10 2006 044088 A1 | 4/2008 |
| EP | 2 412 608 A1 | 2/2012 |
| FR | 2 921 620 A1 | 4/2009 |
| GB | 2 259 063 A | 3/1993 |
| JP | H08-99642 A | 4/1996 |
| JP | 2012-057639 A | 3/2012 |
| JP | 2012-081821 A | 4/2012 |
| JP | 2012-081827 A | 4/2012 |

\* cited by examiner

Fig. 8

USE OF THE POWER STEERING TO COMPENSATE FOR THE NEGATIVE EFFECTS INTRODUCED BY A LIMITED SLIP DIFFERENTIAL

The present invention concerns the power steering systems, and more particularly the power steering systems which equip a running gear both steering and driving, whose steering wheels, maneuvered by the steering system, are also driving, it is that to say arranged to transmit to the road all or part of the driving torque delivered by the motor of the vehicle, in order to propel said vehicle.

The present invention relates more particularly to a steering system intended to maneuver a running gear equipped with a limited slip differential.

It has long been known to equip a driving running gear, typically comprising a left driving wheel and a right driving wheel, with a differential which allows the left wheel to rotate at a speed different from that of the right wheel, in particular upon turning.

A well-known drawback of the differential is that, in case of loss of adhesion (slipping) of one of the driving wheels of the running gear, the driving torque is completely transferred to this wheel, which tends to race, while the other driving wheel, which remains engaged with the road, no longer transmits torque and therefore loses its driving capacity.

To overcome this drawback, special differentials have been in particular developed, called limited slip differentials (or «LSD»), for example of the Torsen® type.

These limited slip differentials, or «self-blocking differentials», are designed to be capable of enabling, as the conventional differentials, a difference in speed of rotation between the left wheel and the right wheel, in particular when turning, but also, unlike conventional differentials, to automatically adopt, by a phenomenon called «self-blocking», when one of the wheels undergoes a loss of synchronism with the other wheel, and more particularly when one of the wheels undergoes a loss of adhesion and therefore a drop in its transmissible torque (transmissible torque which then becomes lower than a predetermined torque threshold, or even tends to reach zero) as well as an increase in its speed of rotation, a «blocked» operation mode, in which the limited slip differential acts to transfer the driving torque, and therefore the driving, to the slowest wheel.

In practice, the limited slip differential thus transmits at any time the majority of the driving torque (that is to say the greater part of the driving torque which is provided to the running gear by the motor of the vehicle and that said running gear is capable of transmitting, in turn, to the ground) to the slowest wheel, which has the lowest speed of rotation, which wheel corresponds in fact, in case of loss of adhesion of the running gear, to the wheel which maintains the most grip (the most adhesion) on the road.

Concretely, the automatic blocking of the limited slip differential is obtained by deliberately introducing, by a suitable constructive arrangement of the differential, a friction torque of non-negligible value between (at least) a side gear, carried by the shaft of one of the wheels, on the one hand, and the differential case on the other hand. The differential case is itself driven by the driving shaft, generally thanks to a pinion fastened to the end of said driving shaft and which meshes with a toothed ring fastened to, or cut in, said case.

This friction torque may be generated for example by a spring compression mechanism, typically with elastic washers.

The friction torque may be also obtained by a viscous coupling mechanism, comprising driving discs steeped in oil.

According to another known possibility, as it is the case for the differentials Torsen® («TORque SENsitive»), side gears may be used (each carried by the shaft of one of the wheels) in the form of a worm, which mesh on satellites, carried by the case of the differential and also each formed by a worm. The satellites associated with each of the side gears are coupled in rotation with each other by a spur gearing. The choice of the respective helix angles of the side gears and the satellite allows making the meshing of each side gear on the satellite corresponding thereto hardly reversible, such that the side gear may easily drive the satellite, but the satellite carried by the case, can hardly (or almost not) drive the side gear.

For convenience, it is possible to note $C_F$ the friction torque, $C_T$ the total driving torque transmitted by the differential to the set of two wheels, $C_L$ the torque output on the slowest wheel and $C_R$ the output torque on the fastest wheel.

Advantageously, within the limited slip differential, the friction torque $C_F$ has a driving effect on the slowest wheel, because the case of the differential has a faster movement than the shaft of the corresponding wheel, whereby the friction torque $C_F$ is added to the torque $C_T/2$ transmitted by the satellite to the side gear and to the wheel shaft, so that the torque $C_L$ coming out on the slow wheel is $C_L=C_T/2+C_F$, while the friction torque has a retardant effect on the fastest wheel, the case having a slower movement than the corresponding wheel shaft, so that the torque $C_R$ output on the fast wheel is $C_R=C_R/2-C_F$. Thus a torque asymmetry is observed between the slow wheel and the fast wheel: $C_L-C_R=2\ C_F$.

It will be also noted that the friction torque $C_F$ may preferably increase when the total driving torque $C_T$ increases.

More generally, regardless of the used limited slip differential $C_L=k^*C_R+C0$ will be substantially obtained, where k is a factor called «Torque Bias Ratio», abbreviated «TBR», which corresponds to the nominal ratio between the torque transmitted by the wheel which transmits the most of torque and the torque transmitted by the wheel which transmits the least of torque, and which therefore shows the evolution (increasing) of the friction torque $C_F$ depending on the total driving torque $C_T$ and C0 represents a pre-load, corresponding to the unladen friction torque of the differential.

Advantageously, the factor k will characterize the capacity of the limited slip differential to transfer more torque to the slow wheel than to the fast wheel, and that, the differential is subjected to non-zero pre-load C0 or, on the contrary without pre-load C0 (as it may be the case in the differential TORSEN®). When the pre-load C0 is zero, the limited slip differential will transfer to the slowest wheel k times the torque transmitted to the fastest wheel: $C_L=k^*C_R$.

Furthermore, it will be noted that, when there is a non-zero pre-load C0, as it is the case in the differentials using a spring compression mechanism, therefore, even if the fast wheel completely loses adhesion and that the torque coming out on the fast wheel $C_R$ fall towards (or even reaches) zero, there remains a non-zero output torque on the slow wheel which is still in mesh: $C_L=2\ C_F=C0$ so that the differential continues to generally transmit to the road, mainly or even exclusively via the slow wheel, a total driving torque of at least $C_T=C_L+C_R=C_L+0=2\ C_F=C0$.

In all cases, the automatic blocking allows limiting, when necessary, the «differential» action of the limited slip differential in order to never completely deprive the running gear of driveability.

The locking rate of the differential (expressed as a percentage) will be called «calibration» T %, which is defined as follows: $T\% = 100*(C_L-C_R)/C_T$.

Knowing that $C_T=C_R+C_L=C_R(k+1)+C0$, we have then $T\%=100*[C_R(k-1)+C0]/[C_R(k+1)+C0]$, or, by simplification if we consider that the pre-load C0 is generally negligible compared to the transmitted torques: $T\%=100*(k-1)/(k+1)$.

For example, if a differential TORSEN®, without pre-load, is seized such that k=2.3, then said differential will transfer to the slowest wheel 2.3 times the torque transmitted to the fastest wheel, and its calibration (blocking rate) will be $T\%=100*(2.3-1)/(2.3+1)=39\%$.

Concretely, the use of a limited slip differential provides multiple advantages (called «positive effects»), among which:
  improving the driveability of the vehicle, since we maintain, in case of slipping of one of the wheels, a transmission of a driving torque to the other wheel, remained engaged with the ground;
  improving straight-line acceleration;
  improving the holding of the turning heading, with in particular a reduced tendency to understeering during the acceleration phase;
  improving the stability of the vehicle in the steering phase, in particular during a steering phase, or still during a straight-line steering on an irregular pavement.

However, the inventors have found that, in the case where a limited slip differential is integrated to the steering (and driving) front axle of a vehicle, then the limited slip differential interferes, in some life situations of the vehicle, and in particular during the acceleration phases, with the operation of the steering mechanism which controls the orientation of the wheels of said front axle.

More particularly, the presence of a limited slip differential within the front axle may generate in the steering mechanism specific forces and force variations, which are proper to the activation of the limited slip differential (that is to say proper to the blocking action of the differential) and which modify the behavior of the steering, as well as the feeling of the steering, that is to say the way the driver of the vehicle tactilely perceives said steering, and therefore intuitively interprets the behavior of the vehicle, through the steering wheel.

However, some effects (called «negative effects») induced by the limited slip differential are considered undesirable, because they disturb the sensations of the driver and may, in some cases, affect the driving comfort, or even the safety of the vehicle and its occupants.

Thus, for example, in turning situation, that is to say when the vehicle follows a curved trajectory, and that the steering wheel as well as the wheels, are therefore steered in the turning direction, the presence (and the entry into action) of the limited slip differential can cause a «freezing» (freeze) of the steering, that is to say a loss of the return action which tends, under ordinary circumstances, and in particular in the absence of limited slip differential, to naturally, recenter the steering, and more particularly to recenter the steering wheel, to its «zero» position corresponding to the straight line.

In practice, such a freezing is caused by the transfer of the driving torque which operates the limited slip differential from the wheel located inside the turn to the wheel located outside the turn when the inner wheel starts to slip and that the speed of rotation of said inner wheel becomes higher than the speed of rotation of the outer wheel.

Such freezing may occur in particular, by way of example, in the following situation.

Assuming that the vehicle is engaged in turning to the right. At constant (longitudinal) speed, it is exerted in the steering mechanism, habitually, a return torque which tends to return the steering wheel to a centered position, that is to say which pulls the steering wheel to the left (so the driver has to exert a force directed to the right to maintain the steering angle of said steering wheel). The return torque is due to the existence of a self-aligning torque, generated by the action of the ground on the wheel of each steered wheel, and which tends to return (in yaw) the wheels in the alignment of the vehicle. The driving torque used to propel the vehicle is moreover mainly directed towards the slowest wheel, that is to say towards the wheel located inside the turn, herein the right wheel.

If the vehicle, still in turning, accelerates, the return torque felt at the steering wheel firstly tends to increase. However, due to the increase of the driving torque, on the one hand, and to the lightening effect of the inner front wheel which is provided by the acceleration (by the longitudinal acceleration which tends to create a mass transfer from the front to the rear of the vehicle, and by the lateral acceleration which, by centrifugal force, tends to create a mass transfer from the inner wheels to the outer wheels), it is possible to reach the limit of adhesion of the front inner wheel (herein the right front wheel), which then begins to slip.

The limited slip differential is then activated (blocked) to transfer the greater part of the driving torque to the outer wheel (the left front wheel).

The torque deviation accordingly created between the inner wheel (herein the right wheel, in the context of a right turning), which receives little driving torque, and the outer wheel (the left wheel), which receives the majority of the driving torque, causes the occurrence of a yaw torque, which tends to drive the steering, and more generally the vehicle, in the direction of the turning (herein clockwise, in a right turning).

This yaw torque results in a sensation of freezing of the steering.

But, in case of freezing of the steering, the steering wheel is not recentered naturally, and the perception of the steering being partly distorted by the absence of feeling, at the steering wheel, of a self-aligning torque (the driver having the impression that the self-aligning torque is zero), one runs the risk of a bad evaluation of the steering, and/or of the maintenance of an inappropriate steering angle, which may of course affect the trajectory of the vehicle, and thus the safety of the occupants of said vehicle or the other road users.

In some extreme cases, beyond the freezing, we may witness a phenomenon of «swallowing», that is to say a self-steering of the steering, the action of the limited slip differential tending to accentuate the steering, that is to say to increase the steering angle of the wheels, and more generally the steering angle of the steering mechanism, in the direction of the turning already engaged.

Moreover, if the vehicle is progressing on an irregular pavement, such as a bumpy road, on which the conditions of adhesion vary rapidly and in a relatively random and different manner for the left wheel and the right wheel, so that the left wheel and the right wheel tend to slip alternately, then the limited slip differential transfers the torque by turns to the right wheel, then to the left wheel and so on, which causes alternating force feedbacks in the steering, at the steering wheel.

These force feedbacks, due to the alternating switch, between the left wheel and the right wheel, of the driving torque which is distributed by the limited slip differential, may be of highly variable intensity and frequency, and more or less irregular.

If the steering wheel is held in hand by the driver, these force feedbacks result in bumps, random and sometimes of relatively high intensity, which are felt in the steering wheel.

Such bumps may make it difficult, or at least uncomfortable, to maintain the steering wheel in the desired angular orientation, and more generally to maintain the vehicle on the desired trajectory.

If the steering wheel is released, then these force feedbacks translate into angular and random oscillations of the steering wheel, called «angular feedbacks», which may reach relatively significant amplitude and thus trigger unwanted maneuvers, likely to deflect the vehicle from its trajectory.

It will be noted that the phenomenon of the force feedbacks is particularly sensitive, and therefore a strong source of discomfort, in the vicinity of the straight line, that is to say when the vehicle follows a straight-line trajectory or close to the straight-line, to the extent that, in such a driving configuration, the intensity of steering assistance is low, or even substantially zero, and therefore may not resist these force feedbacks, making the maintenance of the heading of the vehicle in particular vulnerable to said force feedbacks.

Generally, because of their negative effects, which give the steering, and more generally the vehicle, a behavior at times uncomfortable, at times disconcerting, likely to disturb the driver and cause him inappropriate reactions, especially if said driver does not have the reflexes of an experienced pilot, the limited slip differentials are generally considered incompatible with a series application on the front wheel drive vehicles.

The objects assigned to the invention consequently aim to remedy the aforementioned drawbacks and to provide a solution which allows taking benefit from the typical positive effects of a limited slip differential while guaranteeing comfortable, safe, and intuitive driving, regardless of the degree of piloting control that the driver has.

The objects assigned to the invention are reached by means of a power steering device intended for maneuvering a running gear of a vehicle which comprises a first wheel both steering and driving and a second wheel both steering and driving which are coupled to each other by a limited slip differential arranged to transmit a driving torque to said first wheel and second wheel in order to propel the vehicle, said limited slip differential being designed to automatically activate, in case of loss of synchronism and/or adhesion of one of the first and second wheels, an operation mode called «blocking mode» in which said limited slip differential transfers the majority of the driving torque to the slowest of the first and second wheels, said power steering device further comprising at least one steering mechanism which is arranged to maneuver the first and second wheels in order to modify their steering angle, a steering wheel which allows a driver to pilot said steering mechanism, as well as an assist motor which is in mesh on the steering mechanism and which is controlled by at least one management module arranged to establish an assist setpoint and apply said assist setpoint to said assist motor, said power steering device being characterized in that the steering management module contains laws of compensation which intervene in the establishment of the assist setpoint so as to integrate in said assist setpoint corrective components allowing the assist motor to compensate for some force components, called «disturbing force components», which are induced in the steering mechanism by the activation of the blocking mode of the limited slip differential, so as to provide the driver with a feeling close to that of a running gear devoid of blocking mode.

Advantageously, the invention proposes therefore to virtually mask, by appropriately modified assistance laws, the presence of the limited slip differential, by compensating, by an active reaction of the assist motor, the negative effects of said limited slip differential, so as to bring the steering behavior, and therefore the driving sensations, closer to the sensations provided by a running gear devoid of a limited slip differential (that is to say so as to bring the driving sensations effectively perceived by the driver closer to the sensations that would provide, under the same conditions, a substantially identical running gear but which would be equipped with a conventional differential, instead of a limited slip differential).

The invention therefore allows, by a selective intervention of the assist motor, keeping on the one hand concretely the positive mechanical effects of the limited slip differential, which contribute to improve the driveability and the road holding of the vehicle, while mitigating on the other hand, virtually, that is to say in the feeling of the steering such that said feeling is perceptible at the steering wheel, the negative effects specific to said limited slip differential (that is to say, the effects specific to the automatic activation of the blocking mode of said limited slip differential), such as the freezing and the alternating force feedbacks.

Advantageously, the new sets of assistance laws specific to the invention, which integrate compensation elements intended to counter the negative effects induced by a limited slip differential, allow artificially, substantially maintaining, the sensation of driving a «normal» vehicle, that is to say devoid of automatic blocking function of the differential thereof, and this in particular when the concerned vehicle is a front wheel drive vehicle.

By providing a feeling of driving which is similar to the feeling of a vehicle devoid of automatic differential blocking mode, such that said feeling is coherent with the overall and intuitive perception of the dynamic behavior of the vehicle by the driver, the invention avoids disturbing the driver used to drive front wheel drive vehicles without limited slip differential.

The invention thus enables an instinctive driving, based on the habitual reflexes of the driver, without being necessary for said driver to acquire new driving reflexes specific to the vehicles equipped with limited slip differential, and without risk that the driver, which would be misled by an unusual feeling, adopts reactions that would be unsuitable for the situation of the vehicle, or even proceeds to potentially dangerous maneuvers.

Advantageously, the implementation of the invention is further particularly simple and inexpensive, since it is sufficient to program, or if necessary to reprogram, the computer memory of the electronic management module of the steering in order to integrate laws of compensation specific to the invention therein.

As such, it will be noted that it is easy to consider a range of front wheel drive vehicles comprising, on the one hand, models equipped with a conventional differential, and on the other hand, models equipped with a limited slip differential, all models using the same common power steering device, and in particular the same standardized steering mechanism, but differing in the set of laws applied by the steering management module, which in one case (in the presence of a conventional differential) will contain (and will apply) conventional assistance laws, and in the other case (in the presence of a limited slip differential) will contain and will apply modified assistance laws integrating laws of compensation specific to compensate the negative effects induced by the presence of the limited slip differential.

The rationalization of the production of the vehicle range will be accordingly improved, since it will be sufficient to select the appropriate programming of the management module to adapt the same power steering device at times to a conventional differential vehicle, at times to a limited slip differential vehicle.

In absolute terms, in order to limit the diversity of the assistance laws (in particular to avoid the development of distinct maps) it might be even considered to develop the assistance laws including the laws of compensation, on a vehicle equipped with a limited slip differential, then to check the transferability of all or part of such assist laws on a vehicle provided with a conventional differential (the reverse being of course not possible, to the extent that the presence of a limited slip differential requires providing specific laws of compensation to ensure effective management of negative effects induced by said limited slip differential, and therefore does not allow satisfying conventional assistance laws, insufficient in themselves to ensure such management).

Other objects, features and advantages of the invention will appear in more details upon reading the following description, as well as using the appended drawings, provided by purely illustrative and non-limiting way, among which.

The invention concerns a power steering device 1 which is intended for the maneuver of a running gear 2 of a vehicle 3.

Figures 1, 2, 3:
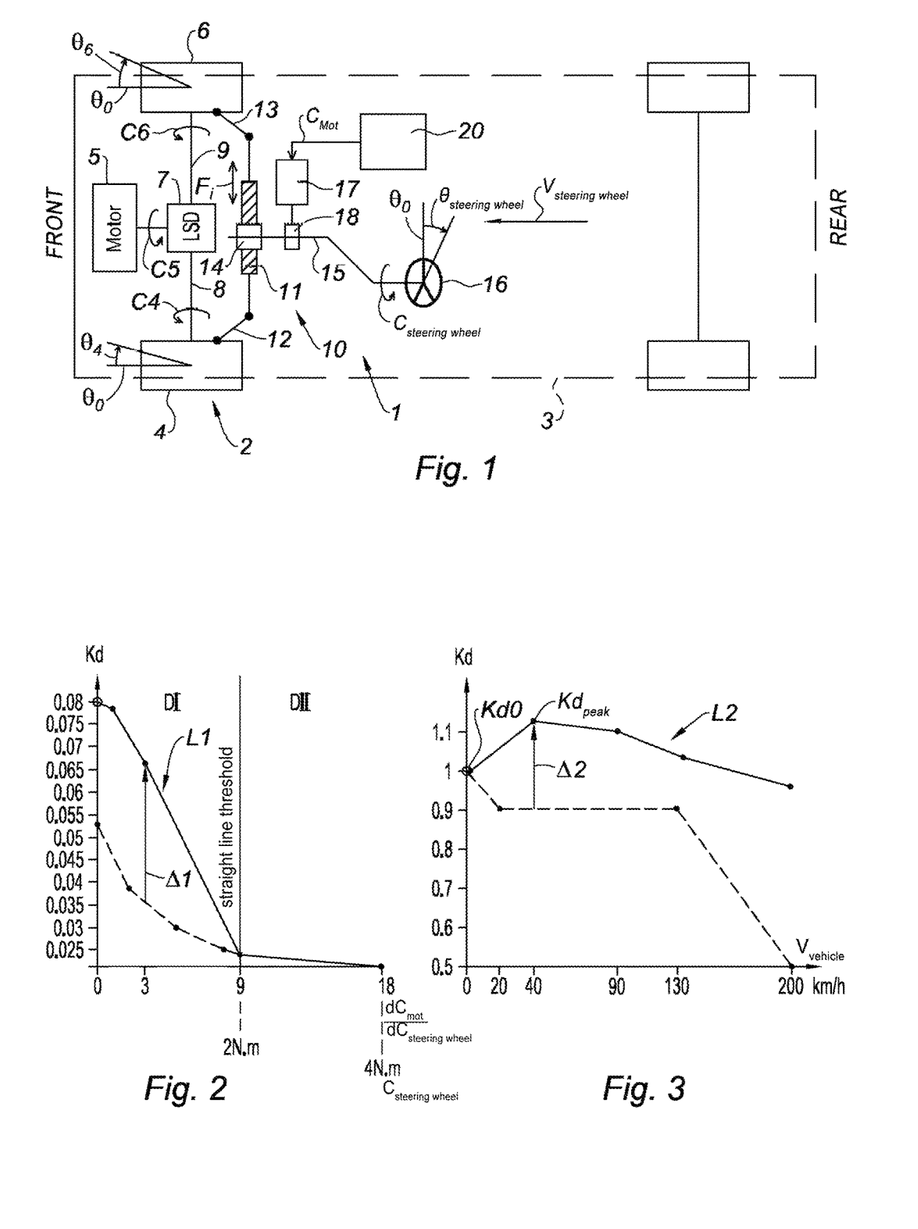
FIG. 1 illustrates, in a schematic top view, a front wheel drive vehicle provided with a limited slip differential and implementing a management module according to the invention in order to compensate the negative effects of said limited slip differential.
FIG. 2 illustrates, in solid line, a law of compensation according to the invention intended to mitigate alternating force feedbacks, said law being expressed herein by a derivative gain which is adjusted depending on the steering wheel torque; this same figure further allows visually comparing the law of compensation with a conventional assistance law (in dotted line) that can be used with a running gear devoid of limited slip differential.
FIG. 3 illustrates, in solid line, a law of compensation according to the invention by evolving the derivative gain as a function of the vehicle speed, by comparison with a law evolution (in dotted line) usable in the absence of limited slip differential.

As illustrated in FIG. 1, said running gear 2 comprises a first wheel 4, herein a left wheel, which is both steering, that is to say, which can be steered in yaw under control of the steering device 1, and driving, that is to say arranged to be driven by the motor 5 intended for the propulsion of the vehicle 3.

The running gear 2 also comprises a second wheel 6, herein a right wheel, which is also both steering and driving.

In a particularly preferred manner, the running gear 2 will form a front axle, located in the front half of the vehicle 3, so as to ensure front wheel drive of said vehicle 3.

According to a preferred variant, the front running gear 2 may be the only drive gear train of the vehicle 3, which will then be strictly a front wheel drive vehicle (typically a front two-wheel drive vehicle, on the four wheels which equip said vehicle).

Nevertheless, it is also possible, alternatively, to apply the invention to the front axle of a vehicle having an integral transmission, permanent or temporary.

The first wheel 4 and the second wheel 6 are coupled to each other by a limited slip differential 7, denoted «LSD» in FIG. 1, which is arranged to transmit a driving torque C5, C4, C6 to said first wheel 4 and second wheel to propel the vehicle 3.

By convention, it will be noted C5 the driving torque (total) which is provided, at the considered instant, by the motor 5 to the limited slip differential 7 and which is then transmitted to the ground by the first and second wheels 4, 6.

Similarly, it will be noted C4 the assigned torque (transferred by the differential 7) to the first wheel 4, that is to say the torque transmitted to the ground by said first wheel 4, and C5 the assigned torque (transferred by the differential 7) to the second wheel 5, that is to say, the torque transmitted to the ground by said second wheel 5.

In practice, there will be therefore (neglecting the losses): C5=C4+C6.

Structurally, the limited slip differential 7 might comprise, as known per se, a case equipped with a toothed ring which is driven in rotation by a driving pinion fastened on the output shaft of the motor 5.

Each of the first and second wheels 4, 6 will be secured to its own shaft, called «wheel shaft» 8, 9, by which the wheel 4, 6 receives its driving torque C4, C6.

The (left) shaft 8 of the first wheel 4 is coaxial to the (right) shaft 9 of the second wheel 6 and coaxial to the axis of rotation of the case of the differential 7, relative to which said wheel shafts 8, 9 are pivotally hinged.

Each wheel shaft (respectively left 8, and right 9) carries a side gear, designed to mesh on at least one satellite carried by the case.

According to the invention, said limited slip differential 7 is designed to automatically activate, in case of a loss of synchronism and/or adhesion of one of the first and second wheels 4, 6, a operation mode called «blocking mode» in which said limited slip differential 7 transfers the majority (that is to say more than half) of the driving torque C5 to the slowest of the first and second wheels 4, 6.

Thus, in the blocking mode, if the speed of rotation of the first wheel 4 is lower than the speed of rotation of the second wheel 6, then the torque C4 directed on the first wheel 4 will be strictly greater than the torque C6 directed on the second wheel, which will therefore receive and transmit more than half of the total driving torque, that is to say that there will be: C4>C6, and C4>C5/2.

More particularly, the triggering of the slipping limitation function of the differential, that is to say the activation of the blocking mode, amounts, as it has been described above, to introduce within the differential 7, between the case and the wheel shafts 8, 9, a friction torque $C_F$ of a non-negligible value, sufficient in case of loss of adhesion of one of the wheels 4, 6 to force a transfer of driveability of the other wheel 6, 4, and more generally to maintain a driveability of the vehicle.

In practice, in the blocking mode, if we note k the Bias Torque Ratio («BTR») and C0 the possible pre-load (which may be zero, in particular in a differential Torsen®, or on the contrary non-zero), the differential 7 induces a asymmetry of torque between the wheels 4, 6, the slowest wheel 4 receiving a majority torque C4=k*C6+C0, with typically C0=2*$C_F$, or even a majority torque worth C4=k*C6 in the absence of pre-load C0, while the fastest wheel (typically the wheel in loss of adhesion) 6 receives a minority torque C6=1/k*(C4−C0) and more particularly C6=1/k*C4.

The activation of the blocking mode, that is to say the introduction of the torque asymmetry between the first and second wheels 4, 6 (asymmetry which is herein equal to C4−C6=(k−1)*C6+C0, and more particularly to (k−1)*C6 in the absence of pre-load, which may for example correspond to a blocking rate T %=39% if k=2.3 as indicated above), is automatically produced in case of loss of synchronism between the first wheel 4 and the second wheel 6 connected by the differential 7, that is to say when a wheel 4 starts to rotate at a speed of rotation different from the speed of rotation of the other wheel 6, in particular due to a modification of the respective adhesion conditions of said wheels 4, 6 on the ground (and therefore a modification of the intensity of the transmissible torque respectively by each of the wheels 4, 6) and/or due to entering a turn.

In practice, in case of loss of adhesion of a wheel, herein the second wheel 6 (also called «idle» wheel), the blocking mode might amount to temporarily secure in rotation (within the limit of the possibilities provided by the friction torque $C_F$) the differential case 7 with the side gear and the shaft 8 of the other wheel 4, and also with the shaft 9 of said idle wheel 6.

Structurally, the limited slip differential 7 might use any technology adapted for the automatic activation of a blocking mode (that is to say for the automatic introduction of a friction torque $C_F$).

Thus, said differential 7 might be for example a differential provided with a spring mechanism (which preferably exerts an axial stress on the side gears), and in particular a spring-washer mechanism, or else a differential provided with a visco-coupler mechanism (with discs), or else a differential screw mechanism of the Torsen® type, in which, as known per se, there are two distinct side gears, each associated with a wheel shaft, and which are both formed by worms of the same orientation, each of said worms meshing on the central portion, with a helical toothing (of a shape complementary to that of the side gear and whose helix pitch defines the friction torque $C_F$), of at least one corresponding satellite, said satellite being itself carried by the case, and in which the two satellites associated respectively to the left side gear and the right side gear are further in mesh, by their end portions arranged in gear wheels.

The use of a Torsen® type differential will be in particular preferred, to the extend that, on the one hand, such a differential allows, by its robust design, the transmission of high torques, where on the other hand, it is insensitive to wear, and finally where such a differential is in particular reactive, since it instantly activates the blocking mode when necessary, without leaving the wheel in loss of adhesion (this reactivity also explaining that a limited slip differential Torsen® is in particular prone to a abrupt behavior, inducing quite sudden and fairly high-intensity negative reactions).

Regardless of the used limited slip differential technology, the calibration value T %, that is to say the ratio between the (maximum) torque difference between the first wheel 4 and the second wheel 6, on the one hand, and the total driving torque, on the other hand, let T %=(|C4−C6|)/C5*100, which could be more particularly worth herein T %=(|k−1|*C6)/((k+1)*C6)*100, will be selected greater than or equal to 15%, greater than or equal to 20%, greater than or equal to 30%, or greater than or equal to 35%, to 40% or even 50%.

It will be noted in this regard, that the implementation of a compensation of the negative effects of the limited slip differential 7 according to the invention allows selecting, including for a «passenger» vehicle intended for a conventional road use, a particularly high calibration value T %, which may possibly reach, or exceed, 60% or even 80%, or substantially 100% (in the case, for example, of a piloted differential, in which the value of the factor k tends to infinity), that is to say, which may reach a value, or be within a range of values, usually reserved for vehicles called «off-road» vehicles, and this without the high calibration value T % causing a discomfort to the driver.

Here again, the technology specific to Torsen® will for example allow setting a calibration T % comprised between 15%, or even 30%, or 35% (low value) and 50% (high value).

Moreover, as illustrated in FIG. 1, the power steering device 1 according to the invention also comprises at least one steering mechanism 10 which is arranged to maneuver the first and second wheels 4, 6 in order to modify the steering angle $\theta_4$, $\theta_6$ of said wheels 4, 6 (that is to say, the respective yaw orientation of each wheel 4, 6 relative to the longitudinal front-rear direction of the vehicle 3).

Said steering mechanism 10 might for example comprise a rack 11, guided in translation (here along a left-right axis, transverse to the longitudinal direction of the vehicle) in a steering casing secured to the vehicle 3, and each end of which is linked to a steering rod (respectively a left tie rod 12 and a right tie rod 13) which is linked to a stub axle carrying the corresponding wheel 4, 6.

The rack 11 will advantageously be driven by a maneuvering pinion 14, fastened to one end of a steering column 15.

As shown in FIG. 1, the power steering device 1 also comprises a steering wheel 16 which allows a driver to pilot the steering mechanism 10.

More particularly, the steering wheel 16 will be fastened on the steering column 15, at one end of said steering column which is opposite to the end on which the maneuvering pinion 14 is fastened, so as to allow a manual actuation of the steering mechanism 10.

The power steering device 1 further comprises an assist motor 17 which is in mesh on the steering mechanism 10, preferably via a reducer 18, such as a reducer with a worm wheel and worm screw.

The assist motor 17 will be, in a particularly preferred manner, formed by a bi-directional rotation electric motor. The use of an electric motor will indeed significantly simplify the implementation of the laws of compensation according to the invention, while allowing the production of a lightweight and space-saving steering device 1.

The assist motor 17 may mesh on the steering column 15, upstream of the maneuvering pinion 14 and of the rack 11, in order to form a mechanism called «single-pinion» mechanism, as illustrated in FIG. 1, or else, alternatively, mesh directly on the rack 11, via a second pinion or a ball screw distinct of the maneuvering pinion 14, in order to form a mechanism called «double pinion» mechanism.

The assist motor 17 is controlled by at least one management module 20 which is arranged to establish an assist setpoint $C_{Mot}$ and apply said assist setpoint $C_{Mot}$ to said assist motor 17.

The assist setpoint $C_{Mot}$ corresponds to the target torque desired to deliver, at the considered instant, by the assist motor 17. In practice, the assist setpoint $C_{Mot}$ may therefore correspond to a current setpoint according to which the assist motor 17 is electrically powered.

Conventionally, the management module 20 may contain, and apply «conventional» assistance laws allowing the assist motor 17 to assist the driver in the maneuver of the steering, in particular by amplifying the force manually exerted by the driver on the steering wheel when the driver wants to turn the steering wheel (and thus to steer) to the left or on the contrary to the right.

The management module 20 might be formed by an electronic circuit, an electronic card, a calculator (computer), a programmable logic controller, or any other equivalent device, which might have a physical control structure, linked to the wiring of the electronic components thereof, and/or, preferably, a virtual control structure, defined by computer programming.

According to the invention, the steering management module 20 contains laws of compensation L1, L2, L3, L4, L5, L6, L7 which intervene in the establishment of the assist setpoint $C_{Mot}$ so as to integrate in said assist setpoint $C_{Mot}$ corrective components Δ1, Δ2, Δ3, Δ4, Δ5, Δ6, Δ7 allowing the assist motor 17 to compensate certain force components Fi, called «disturbing force components», which are induced in the steering mechanism 10 by the activation of the blocking mode of the limited slip differential 7, and this so as to provide the driver with a feeling close to (or almost identical to) that of a running gear 2 devoid of blocking mode.

Advantageously, said laws of compensation L1, L2, L3 . . . are opposed to one or more negative effects of the limited slip differential 7, specific to the activation of the blocking mode of said differential 7, that is to say that said laws of compensation are opposed to the consequences, on the behavior of the steering mechanism 10, of the forces (and variations of forces) which are specifically caused by the engagement of the slip-limiting function of the differential 7 and which interfere with the control actions of said steering mechanism 10 (actions by which the steering angle is modified or maintained to control the heading of the vehicle) as well as with the feeling of said steering mechanism 10 by the driver.

Thus, the automatic intervention of the blocking mode, in particular during the (longitudinal) acceleration phases of the vehicle decided by the driver, is now barely tactilely perceptible, or even not tactilely perceptible any more, by the driver, through the steering wheel 16.

In other words, the management module 20, thanks to its laws of compensation L1, L2, L3 . . . , acts as a dynamic filtering interface which allows, by its compensating action which occurs concomitantly in the triggering of the blocking mode of the differential 7, simulating and virtually restoring, substantially in real time, in all circumstances, and in particular in the acceleration phases of the vehicle and/or in the adhesion loss phases of a driving wheel 4, 6, the behavior of a steering mechanism 10 associated to a «conventional» running gear, devoid of limited slip differential.

By masking to the driver the disturbances which are caused by the engagement of the blocking mode and which are judged undesirable, such as the freezing of the steering wheel 16 in curve or else the alternating force feedbacks, the invention provides the driver with very intuitive driving conditions, with sensations similar to those he experiences when driving a vehicle whose front axle (driving) is devoid of limited slip differential.

The laws of compensation L1, L2, L3 . . . , as well as the «classic» assistance laws, will be stored in a non-volatile memory of the management module 20.

Examples of laws of compensation L1, L2, L3 . . . will be now described in more details, with reference to FIGS. 2 to 8.

In said FIGS. 2 to 8, the laws of compensation are represented in solid line, applicable to the steering running gear 2 equipped with a limited slip differential 7, and in dotted line, for illustrative purposes, conventional assistance laws, which are substantially devoid of compensation functions capable of compensating negative effects induced by the limited slip differential.

These conventional assistance laws (in dotted lines) are in practice applicable to a running gear 2 devoid of automatic blocking function of the differential thereof, but inadequate, because insufficient, to the management of a limited slip differential 7 according to the invention.

By simple convention of graphic representation and for convenience of description, on the graphs of FIGS. 2 to 8, the corrective component Δ1, Δ2, Δ3, Δ4, Δ5, Δ6, Δ7 introduced (respectively) by the corresponding law of compensation L1, L2, L3, L4, L5, L6, L7 (and which intervene therefore in the establishment of the assist setpoint $C_{Mot}$) is assimilated to the difference in value, represented graphically by an arrow, between the plot of the conventional law (in dotted line) and the plot of the law of compensation proper to the invention L1, L2, L3 . . . (in solid line), which amounts to assimile the difference (graphical deviation) between these two types of law to the corrective component which is effectively added to the assist setpoint $C_{Mot}$ and which is, in fact, induced by said difference (graphical deviation) between the two types of laws.

Thus, it is possible to visualize, somehow, the laws of compensation L1, L2, L3 . . . , and more particularly the maps defining said laws of compensation, as the sum of a basic law, conventional, and an additional component which modifies the basic law (by being superimposed on said basic law) and allows transposing said basic law into a law of compensation, by integrating therein the elements necessary for the generation of the corrective component Δ1, Δ2, Δ3 . . . , intended to, and therefore necessary and sufficient to, be opposed to the negative effects of the limited slip differential.

Compared to basic conventional law (in dotted line), the law of compensation L1, L2, L3 . . . according to the invention thus contains and brings somehow additional corrective component Δ1, Δ2, Δ3 ... which is (algebraically) added to the basic conventional component, and therefore to the assist setpoint, so as to compensate the negative effects generated by the limited slip differential 7 relative to a conventional differential.

Preferably, among the laws of compensation, there is at least one attenuation law L1, L2 of the alternating force feedbacks, which generates corrective components Δ1, Δ2 called «anti-feedback» corrective components which oppose the disturbing force components caused by alternations of majority transfers of driving torque C4, C6 between the first wheel 4 and the second wheel 6.

It is thus possible to damp the bumps generated by the overturnings which occur in the majority distribution of the drive torque C5, the blocking mode having the effect of alternately directing the majority of said driving torque C5 (for example a torque equal to $C5/2+C_F$) at times to the first wheel 4, at times to the second wheel 6, according to the respective adhesion fluctuations of said wheels 4, 6, by always favoring the slowest wheel, which has, at the considered instant, the best adhesion.

Preferably, the attenuation law of alternating force feedbacks L1, L2 involves an anti-feedback corrective component called «derivative component» Δ1, Δ2 which is established by multiplying the value of the time derivative $dC_{steering\ wheel}/dt$ of the steering wheel torque $dC_{steering\ wheel}$ by a gain, called «derivative gain» Kd.

The steering wheel torque $C_{steering\ wheel}$ is, as illustrated in FIG. 1, the torque which is exerted by the driver on the steering wheel 16, against the steering mechanism 10, herein against the steering column 15 and the rack 11, and, depending on the circumstances, against the assist motor 17.

Said steering wheel torque $C_{steering\ wheel}$ may be measured by means of a torque sensor, for example a magnetic or electromagnetic, absolute or incremental, analog or digital torque sensor, which will be sensitive to the elastic deformations of a torsion bar interposed between the steering wheel 16 and the steering column 15.

Advantageously, the use of a corrective component 41, 42 proportional (by the derivative gain Kd) to the time derivative of the steering wheel torque $dC_{steering\ wheel}/dt$ allows taking into consideration, both in frequency and intensity, the variations of the steering wheel torque $C_{steering\ wheel}$ over time, that is to say, taking into account the bumps likely to affect the steering wheel 16.

Consequently, the anti-feedback laws L1, L2 involving derivative components allow reacting almost instantaneously to the steering wheel torque variations, by generating a corrective component opposed to the force Fi the cause of the bumps.

Advantageously, said corrective component Δ1, Δ2, obtained as a function of the derivative of the steering wheel torque, is delivered by the assist motor 17 even faster and stronger as the variation rate of the steering wheel torque (and therefore the value of the time derivative of the steering wheel torque) is high.

Thus, the more the force feedback Fi caused by the differential 7 is sudden, the more the anti-feedback corrective components Δ1, Δ2 is strong, to effectively counter said feedback.

The anti-feedback laws of compensation L1, L2 may be designed such that, despite the presence of a limited slip differential 7, and in particular during the activation of the blocking mode of said differential 7 and/or during alternations in the majority distribution of the driving torque C5 from a wheel to the other, the steering wheel torque $C_{steering\ wheel}$ felt at the steering wheel 16, and more particularly the maximum of the steering wheel torque peak induced by an alternating force feedbacks, remains lower than or equal to a maximum admissible value, called «ceiling value».

Thus, in particular, under any circumstances the limited slip differential 7 will itself exceed the holding normal force of the steering wheel that an «average» driver can manually exert, so that the triggering of the blocking mode of the differential 7 might not force the maneuver of the steering against the will of the driver.

In other words, the limited slip differential 7 will be advantageously sufficiently moderated by the laws of compensation L1, L2 for not being capable of faulting driver, and in particular for not causing accidental release of the steering wheel or an accidental driving of the arm which would expose the driver to a sprain.

Nevertheless, the attenuation law of the alternating force feedbacks L1, L2 (by derivative corrective component), although designed to level or even «erase» the force feedback effects induced by the activation of the blocking of the differential 7, will however remain sized so as not to completely filter all the force feedbacks related to the interaction of the wheels 4, 6 with the ground, and this so as not to deprive the driver of any feeling of the road through the steering wheel 15 16 («road feeling»).

Preferably, as illustrated by the law denoted L1 in FIG. 2, the attenuation law of the alternating force feedbacks L1, L2 comprises a law of compensation called «first adaptation function» L1, according to which the derivative gain Kd increases when the steering wheel torque $C_{steering\ wheel}$, exerted (by the driver) on the steering wheel 16, falls under a predetermined threshold, called «straight-line threshold», which indicates that the vehicle 3 follows a trajectory close to the straight line.

It will be noted that, in an equivalent manner, this same law (first adaptation function) L1 may predict that the derivative gain Kd increases when the assist gradient $dC_{Mot}/dC_{steering\ wheel}$, which represents at the considered instant the variation $dC_{Mot}$ of the assist torque delivered by the assist motor 17 (said assist torque here can be assimilated to the assist setpoint $C_{Mot}$ applied to said assist motor 17) added to the corresponding variation of the steering wheel torque $dC_{steering\ wheel}$, falls under a predetermined threshold, called «straight-line threshold», which indicates that the vehicle 3 follows a trajectory close to the straight line.

In order to understand, it is sufficient to consider that, if a basic assistance (mapping) law is graphically represented in the form of a curve which at each steering wheel torque value $C_{steering\ wheel}$ associates a corresponding value of assist torque (assist setpoint) $C_{Mot}$, then the assist gradient $dC_{Mot}/dC_{steering\ wheel}$ corresponds graphically to the slope of said curve at the considered operation point (steering wheel torque, assist setpoint).

To the extent that the total steering force (including the manual force of the driver and the assist force delivered by the assist motor 17), and consequently the (basic) assist force, that it is necessary to provide in order to maintain or accentuate a steering angle $θ_4$, $θ_6$ is in principle stronger when the steering angle is high, and therefore when the torque $C_{steering\ wheel}$ exerted at the steering wheel is high (because the more pronounced the turning is, the greater the need to exert a traction force on the steering mechanism in the corresponding direction in order to steer the vehicle), the assist gradient $dC_{Mot}/dC_{steering\ wheel}$, which reflect the reduction effect provided by the (basic) steering assist, in fact, provides information on the intensity of the steering, that is to say allows quantifying the extent to which the vehicle is moving away or approaching in a straight-line progression.

Thus, the higher the assist gradient is (in absolute value), the more intense the steering is, and the more curved the trajectory of the vehicle is, the lower the gradient is, that is to say close to zero, the closer the vehicle gets to a rectilinear trajectory.

According to another possibility, equivalent to the two previous ones, the first adaptation function L1 might expect that, if the steering device 1 comprises a steering rack 11, on which a longitudinal traction force called «rack force» is exerted, said rack force being representative of the resistance that the wheels 4, 6, and more particularly the tires, oppose the steering maneuvers, then the derivative gain Kd might increase when said rack force falls under a predetermined threshold, called «straight-line threshold», which indicates that the vehicle 3 follows a trajectory close to the straight line.

The rack force might be estimated or measured by any appropriate means, and for example estimated from internal data of the steering device (in particular from the steering wheel torque exerted by the driver on the steering wheel 16, from the torque delivered by the assist motor 17, and from the speed of rotation of the shaft of said assist motor).

Regardless of the used variable (steering wheel torque, assist gradient, rack force, or any other equivalent variable), herein on the abscissa in FIG. 2, in order to quantify the extent to which the trajectory of the vehicle approaches a straight line or on the contrary curves, two domains of the law of compensation (first adaptation function) L1 may be defined, namely a first domain DI called domain of «proximity to the straight line», located under the aforementioned straight line threshold, and a second domain DII called domain of «spacing from the straight line», located beyond said straight line threshold.

In all cases, as shown in FIG. 2, the derivative gain Kd is lower in the second spacing domain from the straight line DII than in the first domain DI, and increases significantly (here substantially linearly) gradually as it approaches the straight line.

This is explained by the fact that the turning requires a maneuvering force higher than the maintaining in the vicinity of the straight line, so that the assistance provided by the assist motor 17 is lower when approaching the straight line, and that the steering is more vulnerable to the force feedbacks when getting closer to the straight line.

The compensation (here by the derivative) of the force feedbacks by the law (first adaptation function) L1 therefore increases gradually when approaching the straight line.

Conversely, in a pronounced steering situation (that is to say in the second domain DII), the driving assistance is strong, in view of the predictable force feedbacks related to the blocking of the differential 7, and the steering is therefore insensitive to said force feedbacks.

By way of indication, the straight line threshold might be set at a value comprised between 1 N·m and 3 N·m, and for example of the order of 2 N·m as illustrated in FIG. 2, in the case where the steering wheel torque $C_{steering\ wheel}$ is used as a reference variable.

Moreover, it will be noted that, in the first domain DI close to the straight line, the law of compensation L1 provides for a derivative gain Kd which is strictly greater than the derivative gain used in the absence of compensation (defined by the conventional law represented in dotted line), and which has a faster growth, gradually when approaching the straight line (that is to say, the abscissa of zero).

Preferably, as illustrated by the law denoted L2 in FIG. 3, the attenuation law of the alternating force feedbacks L1, L2 comprises a law of compensation called «second adaptation function» L2, according to which the derivative gain Kd is adapted depending on the longitudinal speed of the vehicle $V_{vehicle}$.

Preferably, the second adaptation function L2 has, as illustrated in FIG. 3, a maximum $Kd_{pic}$ which is located at a speed abscissa $V_{vehicle}$ comprised between 35 km/h and 90 km/h, preferably between 35 km/h and 50 km/h, and for example substantially equal to 40 km/h.

More generally, the second adaptation function L2 preferably has, in a speed range which extends between 35 km/h and 50 km/h, or even more widely between 20 km/h, or even 10 km/h (low value) and 90 km/h or even 130 km/h (high value), derivative gain values Kd, among which the maximum $kd_{peak}$, which are (preferably all) greater than a y-intercept value $kd_0$ which corresponds to the value of the derivative gain at zero speed (0 km/h).

Preferably, the second adaptation function L2 will be generally concave, and, to this end, will have at least one increasing domain, between the y-intercept value $kd_0$ which corresponds to the value of the derivative gain at zero speed, and the maximum $kd_{peak}$ which is located at a speed abscissa $V_{vehicle}$ comprised between 35 km/h and 90 km/h, preferably between 35 km/h and 50 km/h, and for example substantially equal to 40 km/h, then a decreasing domain beyond said maximum $kd_{peak}$ (that is to say for the speed abscissas greater than the maximum speed abscissa $kd_{peak}$).

Advantageously, the second adaptation function L2 allows maximizing the derivative gain Kd in a range of speeds (typically between 35 km/h, or even 40 km/h, and 90 km/h) in which the vehicle is in particular likely to be exposed to significant accelerations and high driving torque values C5, C4, C6, such as to trigger the blocking of the differential 7 and to induce the most marked negative effects.

In other words, the second adaptation function L2 allows maximizing the derivative gain Kd in a speed range of the vehicle $V_{vehicle}$ which is characteristic of life situations of the vehicle in which the torque (also called «wheel torque») C4 assigned to the left wheel 4, and/or respectively the torque C6 assigned to the right wheel 6, is maximum, that is to say exceeds a predetermined threshold close to the maximum value that the vehicle may materially deliver.

Concretely, this speed range in which the wheel torque C4, C6 corresponds to a set of particular combinations of the speed of the motor 5 on the one hand, and of the speed ratio engaged on the other hand, which promote the transmission of a high torque.

Typically, this speed range might cover an area of use in which the second, the third, or even the fourth ratio of the speed gearbox is engaged, and in which the driver is likely to engage sustained accelerations, in particular in exit from turning or to enter in the flow of traffic.

In particular, a derivative gain peak $Kd_{pic}$ might be observed in the vicinity of 40 km/h, which typically corresponds to the beginning of a phase of strong acceleration with the second speed ratio engaged, that is to say high biasing of the driving wheels 4, 6 and therefore of punctual risk of loss of adhesion.

Moreover, it will be noted that the attenuation law of alternating force feedbacks, noted for convenience «L1, L2», may involve the first adaptation function L1, or the second adaptation function L2, or, preferably, both the first and the second adaptation functions L1, L2.

For example, the derivative gain Kd which will effectively be used by the attenuation law of the alternating force feedbacks L1, L2 might correspond to the product of the coefficients (gain components) respectively from the first adaptation function L1 and from the second adaptation function L2.

Thus, in the example provided, the adjustment of the derivative gain Kd proposed by the second adaptation function L2 shown in FIG. 3 may be advantageously used as a multiplier intended to come weight (and more particularly to amplify, when the value is strictly greater than 1, as it is here the case between 10 km/h and 130 km/h), the initial derivative gain value Kd determined, depending on the steering wheel torque (and more generally depending on the spacing from the straight line), from the first adaptation function L1 shown in FIG. 2.

It will be also noted that the second adaptation function L2 specifically adapted to the compensation of the alternating force feedbacks proposes, herein again, and as illustrated, in FIG. 3, the corrective component $\Delta 2$, a derivative gain Kd greater than that offered by the conventional law (represented in dotted line).

Furthermore, while the conventional law (in dotted line) follows a continuously decreasing function (possibly step function), the conventional derivative gain decreasing when the speed of the vehicle increases, and that this same conventional law returns a multiplier lower than 1 (therefore, in absolute terms, an attenuating coefficient), the second adaptation function L2 has here a generally concave plot, that is to say domed, such that if we consider two points of the curve, the segment which joins these two points is located under said curve, said plot culminating at the peak value $Kd_{peak}$, herein strictly greater than 1 (therefore amplifying), peak before which the second adaptation function L2 is increasing, and after which said second adaptation function is decreasing.

Moreover, according to a preferred feature which may constitute an invention in itself, there is found, among the laws of compensation, at least one anti-freezing law L3, L4, L5, L6, L7 which generates corrective components $\Delta 3$, $\Delta 4$, $\Delta 5$, $\Delta 5$, $\Delta 6$, $\Delta 7$ called «corrective return components» which, when the steering wheel 16 is rotated so as to form a non-zero steering angle $\theta_{steering\ wheel}$ relative to a central position $\theta_0$ corresponding to the straight-line trajectory, are capable of forcing the return of the steering wheel 16 to said central position $\theta_0$, against the disturbing force components Fi which tend to reduce or even remove the self-aligning torque of the wheels 4, 6 (or at least which tend to reduce or remove the tactile perception of such a self-aligning torque at the steering wheel 16).

In a first approximation, the steering angle $\theta_{steering\ wheel}$ might be assimilated, that is to say the angular position $\theta_{steering\ wheel}$ of the steering wheel 16 considered relative to the central position $\theta_0$, as equal to the steering angle $\theta_4$, $\theta_6$ of the wheels 4, 6, and more generally as equal to the (average) steering angle of the steering mechanism 10.

The anti-freezing law L3, L4, L5, L6, L7 advantageously prevents the limited slip differential 7 from eliminating, in particular during acceleration phases when turning, the sensation of a return torque perceptible at the steering wheel 16, and a fortiori prevents the limited slip differential 7 from creating a swallowing (a spontaneous over-steering).

Said anti-freezing law involves to this end corrective return components $\Delta 3$, $\Delta 4$, $\Delta 5$, $\Delta 6$, $\Delta 7$ which create at the steering wheel 16 a sensation of non-zero (resulting) return torque, as long as said steering wheel 16 deviates from the central position $\theta_0$ thereof.

The return is «active» in that the assist motor 17 is actively biased and acts to create a return force (a torque) in the steering wheel 16, which is opposed to the manual holding of said steering wheel 16 in a non-zero steering angle (steering wheel angle) $\theta_{steering\ wheel}$ and which tends to actively return said steering wheel 16 to the central position $\theta_0$ thereof.

Figure 4:
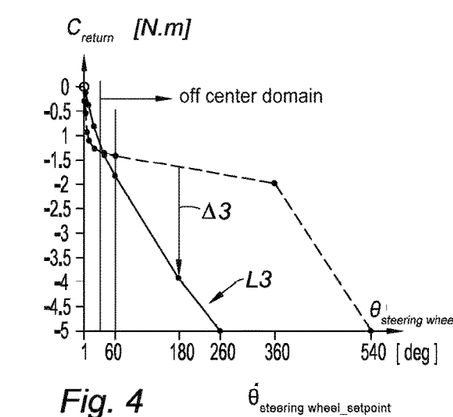
FIG. 4 illustrates, in solid line, a law of freezing compensation, expressed in the form of an open-loop return setpoint, homogeneous to a motor torque setpoint, which evolves as a function of the angular deviation between the instantaneous position of the steering wheel and the central position of said steering wheel, by comparison with a law (dotted line) usable in the absence of a limited slip differential.

Preferably, as illustrated in FIG. 4, the anti-freezing law comprises an open-loop return function L3 which establishes a return setpoint $C_{Return}$ by multiplying an angular difference, defined as the difference between the instantaneous (absolute) angular position of the steering wheel $\theta_{steering\ wheel}$ and central angular position $\theta_0$ of said steering wheel 16, by a gain, called «open-loop active return gain» $GBO_{Return}$.

The return setpoint $C_{Return}$, which is integrated into the assist setpoint $C_{Mot}$ applied to the assist motor 17, is representative of a return torque (or a return torque component) which contributes to define the setpoint applied to the assist motor 17, and therefore the action of said assist motor.

The return setpoint $C_{Return}$ is therefore homogeneous to an assist torque setpoint $C_{Mot}$, hence its expression in N·m in FIG. 4.

In practice, the central position of the steering wheel might be considered, by convention, as the origin of the measurement of the absolute angular position of the steering wheel $\theta_{steering\ wheel}$, that is to say that it will be possible to set: $\theta_0 = 0$ deg, which will return to assimilate the aforementioned «angular deviation» to the angular position of the $\theta_{steering\ wheel}$.

As illustrated in FIG. 4, the open-loop return function L3 allows establishing a return setpoint $C_{Return}$ which contains, relative to a conventional open-loop return law (represented in dotted line), a corrective return component $\Delta 3$, specific to neutralize the freezing effects induced by the differential 7, and which reinforces (here as soon as the angular position of the steering wheel $\theta_{steering\ wheel}$ exceeds 30 degrees, or even 20 degrees) the intensity of the return action exerted by the assist motor 17.

In any case, according to the open-loop return function L3, the intensity of the return setpoint $C_{Return}$ increases, in absolute value, with the angular deviation, that is to say is increasing (in absolute value), when the steering wheel angle $\theta_{steering\ wheel}$ increases.

Thus, the more the steering wheel 16 deviates from its central position, the greater the intensity of the return force generated by the assist motor 17 is.

It will be noted in this regard that the negative sign used by convention on the ordinate axis of FIG. 4 simply indicates that the return setpoint $C_{Return}$, which falls within the definition of the assist setpoint $C_{Mot}$, is opposed to the manual maneuver of the steering wheel 16, and therefore tends to ensure that the assist motor 17 pulls (returns) the steering wheel in the opposite direction to the direction in which the driver manually and voluntarily actuates said steering wheel 16.

It will be also noted that the open-loop return function L3, and more particularly the corrective return component $\Delta 3$ it contains, is such that the intensity of the return setpoint $C_{Return}$ exceeds the intensity of the conventional return (indicated by the curve in dotted line) as soon as the angular position of the steering wheel (steering wheel angle) $\theta_{steering\ wheel}$ exceeds 30 degrees, or even as soon as the angular position of the steering wheel exceeds 20 degrees, that is to say as soon as the steering wheel 16, and more generally the vehicle 3, is located in a domain called «off center» domain, that is to say in a turning situation in which said vehicle no longer progresses in a straight line but comes alongside or follows a curved trajectory.

In other words, the compensation integrated in the open-loop return function L3 has the effect of increasing, relative to a conventional return function, the return setpoint $C_{Return}$ beyond 30 degrees, or even from 20 degrees, and more generally in the whole «off center» domain.

The freezing phenomenon being indeed likely to occur when turning, and even more likely to occur as the turning is pronounced (and therefore as the value of the angular position of the steering wheel $\theta_{steering\ wheel}$ is high), it is advantageous to reinforce the return setpoint obtained by the (compensating) return function L3, relative to a conventional return law, once the steering wheel 16 is off center.

Furthermore, when the steering wheel 16 is «off center», the open-loop return gain $GBO_{Return}$, specific to the function L3 integrating the compensation, might advantageously be greater than the gain of a corresponding conventional return function, which is graphically translated in FIG. 4, into a steeper slope of the function L3 relative to the slope of the conventional return function represented in dotted line.

In this case, the open-loop return gain $GBO_{Return}$, specific to the function L3 might herein be greater than the conventional gain at least on the angular position range of the steering wheel comprised between 30 degrees (or even 20 degrees) and 360 degrees.

As illustrated in particular in FIG. 4, the return setpoint $C_{Return}$ accordingly compensated by the function L3 may substantially reach twice the value of the conventional return setpoint when the angular position of the steering wheel reaches and exceeds about 120 degrees, and may exceed three times the value of the conventional return setpoint when the angular position of the steering wheel reaches and exceeds 210 degrees.

Typically, as illustrated in FIG. 4, an anti-freezing law L3 might impose a return setpoint $C_{Return}$, and therefore a return torque, which will be equal to or greater, in absolute value, than 1.5 N·m as soon as the angular position of the steering wheel reaches or exceeds 40 degrees, comprised between 1.8 N·m and 2 N·m when the angular position of the steering wheel reaches 60 degrees, brought to about 4 N·m when the angular position of the steering wheel reaches 180 degrees, which might then reach 5 N·m when the angular position of the steering wheel reaches 260 degrees and is kept beyond.

Figure 5:
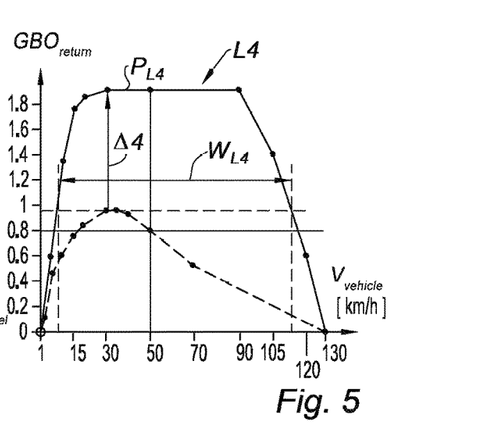
FIG. 5 illustrates, in solid line, the evolution of the open-loop return gain as a function of the speed of the vehicle, by comparison with a law (in dotted line) usable in the absence of a limited slip differential.

Preferably, as illustrated in FIG. 5, the open-loop return gain $GBO_{Return}$ is adjusted as a function of the longitudinal speed of the vehicle $V_{vehicle}$, by a generally concave amplification function L4 whose width at half height $W_{L4}$ covers a speed range which extends from a low value equal to or lower than 15 km/h, for example in the range of 8 to 10 km/h in FIG. 5, to a high value equal to or greater than 100 km/h, for example in the range of 110 km/h or even 115 km/h in FIG. 5.

In this case, the value indicated on the ordinate in FIG. 5 might correspond to a multiplier which weights the open-loop return gain $GBO_{Return}$ (and in this case amplifies said gain when the value of the multiplier is greater than 1).

As illustrated in particular in the example of FIG. 5, the amplification function L4 allows rapidly increasing the open-loop return gain with the speed, and maintaining a high value of gain (greater than the half height of the peak of the function L4) from 15-20 km/h and to at least 90 km/h or even to at least 100 km/h.

More particularly, the function L4 might have a maximum (peak) in the form of a substantially constant plateau $P_{L4}$, which extends over a particularly wide speed range, herein from about 30 km/h to 90 km/h or even 100 km/h.

Then, the amplification function L4 will decrease preferably to reach zero from a threshold speed, herein in the range of 130 km/h.

It will be noted in this regard that, in practice, the threshold speed, herein of 130 km/h, corresponds to the speed beyond which no more or almost no more freezing is observed, so that it is no longer necessary to provide a corresponding return gain.

In practice, this threshold speed might correspond to at least 75%, to at least 80%, to at least 90%, or even to 100% of the maximum speed that the vehicle may reach.

Of course, particularly in the case of sport vehicles intended to be able to run, and take turnings, at very high speeds, this threshold speed might be raised accordingly, and for example be brought to 200 km/h or even to 250 km/h.

In such case, the range of speed covered by the width at half height $W_{L4}$ of the amplification function L4 might be increased consequently, the speed marking the limit of the plateau $P_{L4}$ which may be for example increased up to at least 180 km/h or even at least 200 km/h.

Advantageously, the amplification function L4 allows, relative to a conventional function (represented in dotted line in FIG. 5), extending the speed range over which the open-loop return gain $GBO_{Return}$ is active, which allows covering a particularly wide speed range, and therefore maintaining an effective return of the steering wheel in all the predictable situations in which it is sought to transmit a high driving torque C5 to the wheels 4, 6, in particular in the situations corresponding to acceleration phases.

In practice, it is thus noted that the width at half height $W_{L4}$ of the amplification function L4, a function which includes a corrective component Δ4 intended to compensate the freezing effects of the limited slip differential 7, is clearly greater than the width at half height of the corresponding conventional function 5 (of the order of twice the width at half height $W_{L4}$ of said conventional function), and covers in particular a range of higher speeds, typically beyond 60 km/h and up to (at least) 100 km/h or up to (at least) 115 km/h, or even to the maximum speed that the vehicle can reach.

It is also noted that, generally, the amplification function L4 returns a value (multiplier) which is strictly greater than that of the corresponding conventional function. This is in particular the case over the speed range corresponding to the width at half height $W_{L4}$ thereof as well as over the speed range corresponding to the plateau $P_{L4}$ thereof, ranges in which the value returned by the amplification function L4 is at least 1.5 times, or even 2 times higher than the value returned by the conventional function.

Moreover, said multiplier is herein greater than 1 over a speed area which almost coincides with the width at half height $W_{L4}$, from about 10 km/h up to 110 km/h, so that the open-loop gain is amplified over this whole domain.

Advantageously, the reinforcement (and in this case the amplification) of the open-loop return gain $GBO_{Return}$ allows intensifying the return of the steering wheel 16 against the freezing.

Moreover, it will be noted that the open-loop return function L3 and the amplification function L4 may in particular contribute to effectively compensate the freezing in a situation of held steering wheel, that is to say when the driver holds the steering wheel 16 in hand and is capable of exerting a manual force on said steering wheel 16, typically to maintain the heading of the vehicle when turning.

Figure 6:
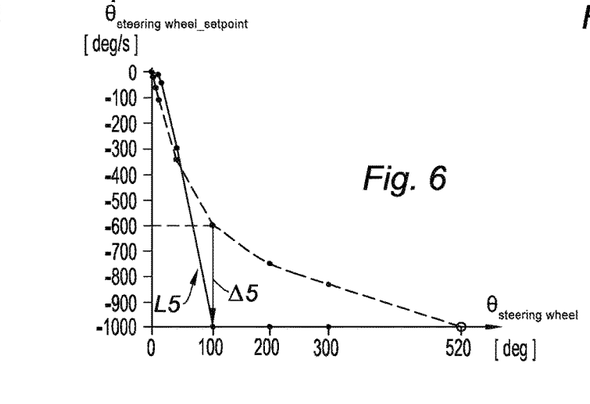
FIG. 6 illustrates, in solid line, a law of freezing compensation, expressed in the form of a return angular speed setpoint of the steering wheel, in the closed-loop, which evolves as a function of the angular deviation between the instantaneous position of the steering wheel and the central position of said steering wheel, by comparison with a law (in dotted line) usable in the absence of a limited slip differential.

According to a preferred possibility of implementation, the anti-freezing law comprises, as illustrated in FIG. 6, a closed-loop return function L5, which defines a return angular speed setpoint of the steering wheel $\dot{\theta}_{steering\_wheel\_setpoint}$ and which adapts in real time the assist setpoint $C_{Mot}$ applied to the assist motor 17 so that the actual return angular speed of the steering wheel $\dot{\theta}_{steering\_wheel}$, that is to say the speed of rotation at which the steering wheel 16 rotates to reach its central angular position $\theta_0$, follows said return angular speed setpoint of the steering wheel $\dot{\theta}_{steering\_wheel\_setpoint}$.

In other words, the function L5 allows carrying out a servo-control (in a closed loop) of the return of the steering wheel 16, by using the speed of rotation (return speed) of the steering wheel 16 as a servo-controlled variable.

It will be noted that such a function L5 is particularly adapted to the management (to the compensation) of the freezing (and a fortiori of the swallowing) in a situation of a released steering wheel, that is to say when the steering wheel 16 is no longer held in hand by the driver (typically when the driver, when leaving the turn, intuitively lets the steering wheel 16 «naturally» return back to its central position $\theta_0$ by a self-alignment phenomenon).

It will be also noted that the closed-loop return function L5 (using the return angular speed of the steering wheel) and the open-loop return function L3 (using the angular position of the steering wheel) may coexist and possibly be applied simultaneously, in particular in the situation of a held steering wheel, in order to improve the compensation of the freezing by accentuating the return effect of the steering wheel 16.

Preferably, as illustrated in FIG. 6, the steering wheel return speed setpoint $\dot{\theta}_{steering\_wheel\_setpoint}$ increases, in absolute value, with the angular deviation which is defined as the difference between the instantaneous angular position of the steering wheel $\theta_{steering\_wheel}$ and the central angular position $\theta_0$ of said steering wheel 16 (that is to say in practice as a function of the absolute angular position $\theta_{steering\_wheel}$ of the steering wheel).

As shown in FIG. 6, the closed-loop return function L5 therefore allows increasing the steering wheel return speed setpoint $\dot{\theta}_{steering\_wheel\_setpoint}$ (in absolute value) as the steering wheel 16 deviates from the central position $\theta_0$ thereof.

It will be noted that the negative sign used here by convention simply indicates that the return is performed in the direction of rotation which is opposite to the steering direction of the steering wheel at the considered instant (the return setpoint aiming to return said steering wheel 16 to its central position, while the manual steering tends to move the steering wheel away from said central position).

It will be also noted that, relative to a conventional law (represented in dotted line), the closed-loop return function L5 accentuates, by the corrective component A5 thereof, the growth rate of the steering wheel return speed setpoint depending on the angular position of said steering wheel, that is to say increases the slope of the function, at least in the interval of the angular position of the steering wheel comprised between the central position (zero degrees) and 100 degrees, and preferably on the majority even over the entire total angular (half-)travel of the steering wheel 16, comprised between the central position of the steering wheel 16 ($\theta_0$=0 degrees) and the extreme position of the steering wheel 16 (that is to say the maximum value that the steering angle may take, herein 520 degrees in FIG. 6).

Typically, the average slope proper to the function L5 including the compensation might be greater than or equal to 1.2 times, to 1.5 times, or even to 2 or 3 times the average slope of the corresponding uncompensated conventional function (in dotted line), on said angular position interval (herein [0 deg; 100 deg], or even [0 deg; maximum steering wheel angle]).

Figure 7:
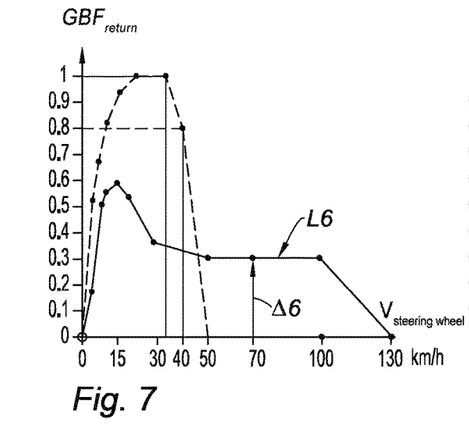
FIG. 7 illustrates, in solid line, the adjustment of the closed-loop return gain as a function of the speed of the vehicle, by comparison with a law (in dotted line) usable in the absence of a limited slip differential.
Figure 8:
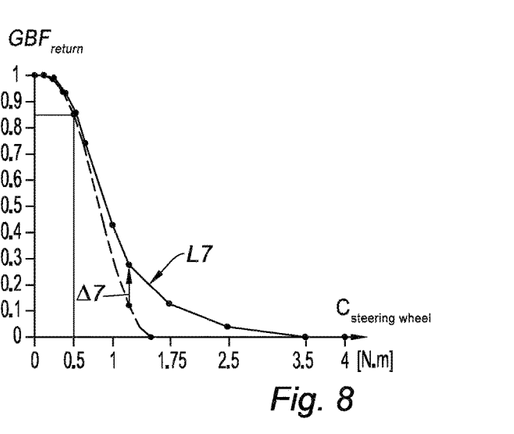
FIG. 8 illustrates, in solid line, the adjustment of the closed-loop return gain as a function of the steering wheel torque, by comparison with a law (in dotted line) usable in the absence of a limited slip differential.

Preferably, the closed-loop return function L5 involves a gain, called «closed-loop return gain» $GBF_{Return}$, which is adjusted on the one hand, depending on the longitudinal speed of the vehicle $V_{vehicle}$, according to a first adjustment function of a closed-loop return gain, denoted L6, and on the other hand, as a decreasing function of the steering wheel torque $C_{steering\_wheel}$ exerted on the steering wheel 16, according to a second adjustment function of a closed-loop return gain, denoted L7.

An example of a first adjustment function L6 of a closed-loop return gain $GBF_{Return}$, which modifies (by multiplier) said gain depending on the speed of the vehicle, is illustrated in FIG. 7.

Said first adjustment function L6 firstly has, between about 0 and 50 km/h, a first concave domain, with a (maximum) peak of about 15 km/h to 20 km/h, and then, between about 50 km/h and 130 km/h, a second domain in which the gain is maintained at a non-zero level, although lower than the aforementioned peak, initially in the form of a substantially constant plateau (up to about 100 km/h), then in the form of a decreasing function (herein between 100 km/h and 130 km/h). Beyond that, the gain reaches zero.

It will be noted that, similarly to the amplification function L4 associated with the open-loop return, the first adjustment function L6 reaches zero, that is to say, turns the closed-loop return gain $GBF_{Return}$ off, when the speed of the vehicle reaches and exceeds a speed threshold from which, in practice, no more freezing is observed, said speed threshold being set in this case as it has been indicated above with reference to the amplification function L4, and for example herein selected equal to 130 km/h.

It will be also noted that the corrective component A6 induced by the first adjustment function L6, has the effect, relative to the corresponding conventional adjustment function (in dotted line), to reduce the closed-loop return gain $GBF_{Return}$ in the aforementioned first domain (below 40 km/h, or even up to 50 km/h), and on the contrary to accentuate said gain, by maintaining it at a non-zero level, in the second domain (beyond 50 km/h, and in this case up to the speed threshold of 130 km/h).

Here again, these adaptations allow ensuing effective return of the steering wheel 16 over the entire speed range which covers in practice all the predictable acceleration and administration situations of a high driving torque C5 to the running gear 2.

An example of a second adjustment function L7 of the closed-loop return gain $GBF_{Return}$, which modifies (by multiplier) said gain depending on the steering wheel torque $C_{steering\_wheel}$, is illustrated in FIG. 8.

This second (decreasing) adjustment function L7 allows maintaining a high closed-loop return gain $GBF_{Return}$ for the low steering wheel torque values $C_{steering\_wheel}$, typically lower than 1.5 N·m, 1 N·m, or even 0.5 N·m, 15, which are characteristic of a trajectory in the vicinity of the straight line and/or of a released steering wheel situation, and then significantly reducing said gain (by a multiplier herein lower than 0.1) when the steering wheel torque is beyond 1.75 N·m. Said function will even annul said gain from a steering wheel torque of 3 N·m or 3.5 N·m and beyond.

Thus, it is possible to accentuate the return of the steering wheel, and therefore to converge the steering wheel 16 more rapidly towards the central position $\theta_0$ thereof, when said steering wheel is released by the driver (which, intuitively, accordingly wants to let the steering wheel recenter), or when the driver in the vicinity of the straight line, does not firmly hold the steering wheel 16 and only operates slight corrections of trajectory.

Conversely, the return will be less marked when the steering wheel 16 is subjected to a significant torque, which indicates that said steering wheel is firmly held in hands by the driver.

Relative to a conventional adjustment function (represented in dotted line in FIG. 8), the corrective component Δ7 induced by the second adjustment function L7 has a substantially homothetic enlargement effect (relative to the origin of the graph of FIG. 8) which allows slightly accentuating the intensity of the closed-loop return gain $GBF_{Return}$, and this over a wider range of steering wheel torque $C_{steering\ wheel}$.

In practice, the management module 20 according to the invention will comprise at least one law of compensation, and preferably several laws of compensation among those L1, L2, L3, L4, L5, L6, L7 described hereinabove, and in particular at least one attenuation law of the alternating force feedbacks L1, L2 and/or at least one anti-freezing law L3, L4, L5, L6, L7.

Of course, the invention also concerns per se a data medium readable by a calculator and comprising computer program code elements allowing the execution of the one and/or the other of the aforementioned laws of compensation L1, L2, L3, L4, L5, L6, L7.

Furthermore, the invention also relates to a front-wheel drive motor vehicle 3 comprising a front running gear 2 both driving and steering, which has a first wheel 4 both driving and steering and a second wheel 6 both driving and steering, said vehicle 3 being characterized in that the first wheel 4 and the second wheel 6 are coupled to each other by a limited slip differential 7 arranged to transmit a driving torque C5, C4, C6 to said first wheel and second wheel in order to propel the vehicle, said limited slip differential 7 being designed to automatically activate, in case of loss of synchronism and/or loss of adhesion of one of the first 4 and second 6 wheels, an operation mode called «blocking mode» in which said limited slip differential 7 transfers the majority of the driving torque C5 to the slowest of the first and second wheels 4, 6, and in that said vehicle 3 comprises, in order to maneuver said front running gear 2, a power steering device 1 according to any one of the variants described above, so as to provide the driver with a feeling close to that of a front running gear devoid of blocking mode.

Similarly, the invention concerns per se the use of an assist motor 17 of a power steering 1 equipping a vehicle running gear 2, preferably a front running gear 2, which is a running gear both driving and steering provided with a limited slip differential 7, in order to substantially counter in real time the effects induced in said power steering by the activation of the blocking of the limited slip differential 7 (that is to say typically to counter the forces Fi causing alternating force feedbacks or freezing of steering), so as to modify the feeling provided for the driver by reproducing a virtual feeling which is substantially similar to the feeling that would provide this same running gear if it was devoid of limited slip differential (that is to say devoid of automatic blocking function allowing switching the majority of the driving torque C5 towards the slowest driving wheel 4, 6).

In practice, the implementation of the invention may be translated into a configuration (adjusting) method of a power steering device 1, method which may be implemented by modeling/simulation, and/or empirically during test campaigns conducted on the vehicle 3.

During this method, it will be firstly possible to define, during a reference definition step, by appropriate measurements or simulations, a first behavior pattern, called conventional behavior pattern, which characterize the reactions of the power steering device 1, and in particular the forces sent through the steering mechanism 10 to the steering wheel 16, in different life situations, in particular in different acceleration situations including turning, of a vehicle 3 whose drive running gear 2 is equipped with a conventional differential, devoid of automatic blocking function.

The reactions of the power steering device might advantageously be characterized by a selected parameter (or a set of parameters), called «feeling parameter», which translates the perception of the vehicle by the driver.

Said feeling parameter may be typically the steering wheel torque $C_{steering\ wheel}$ perceptible at the steering wheel 16 (held steering wheel) and/or the return speed $\dot{\theta}_{steering\ wheel}$ of said steering wheel (released steering wheel).

Then, it will be possible, during a characterization step, to measure or simulate, in the same life situations as those used to define the conventional behavior pattern, the reactions (and therefore the values of the feeling parameter) of the same power steering device 1, equipping the same type of vehicle 3 but this time provided with a limited slip differential 7 instead of the conventional differential, and thus to establish a second behavior pattern called disturbed behavior pattern. This second behavior pattern intrinsically reflects, among others, the negative effects induced by the presence of the limited slip differential 7.

It is then possible, during a third processing step, to compare the second disturbed behavior pattern with the first conventional behavior pattern, and in particular the values of the feeling parameter taken respectively in the first pattern and in the second pattern, and to deduce deviations found during this comparison of the laws of compensation L1, L2, L3, L4, L5, L6, L7 which, applied to the vehicle 3 equipped with a limited slip differential 7, will allow said vehicle to reproduce the first conventional behavior pattern.

Preferably, once selected, a feeling parameter which characterizes the perception of the vehicle by the driver, the laws of compensation L1, L2, L3, L4, L5, L6, L7 will allow the vehicle 3 equipped with a limited slip differential 7, at least in the life situations identified as relevant (typically the situations suitable to alternating force feedbacks or to freezing), to reproduce the conventional behavior pattern, that is to say to restore a feeling parameter whose value, all parameters being otherwise constant, approaches the value which is taken, in the same life situation, by the same feeling parameter in the conventional pattern, and this preferably with a tolerance lower than or equal to +/−20%, +/−10% or even +/−5% relative to the target value that the value of the feeling parameter, obtained in the conventional pattern, constitutes.

In other words, the laws of compensation L1, L2, L3, L4, L5, L6, L7 will allow restoring, within the vehicle 3 equipped with a limited slip differential 7, a feeling parameter (steering wheel torque or speed of rotation of the steering wheel) whose value will not deviate by more than 20%, 10% or even 5%, from the value taken by this same feeling parameter in the same life situation, but within a vehicle equipped with a conventional differential.

Advantageously, the invention therefore allows considering a generalization of the use of a limited slip differential, even highly calibrated, in the front-wheel drive vehicles, including in high power vehicles with high acceleration capacities.

Moreover, if necessary, the laws of compensation may be further introduced in retro-fitting to adapt power steering devices already existing and thus to allow an effective management of negative effects of a limited slip differential.

Of course, the invention is not limited to the sole aforementioned variants, those skilled in the art are in particular in position to isolate or freely combine the one or the other of the previously described features, or to substitute them for equivalents.

The invention claimed is:

1. A power steering system comprising:
    a first wheel and a second wheel coupled to each other;
    a limited slip differential coupling the first wheel and the second wheel, the limited slip differential being configured to transmit a driving torque to the first wheel and to the second wheel, the limited slip differential being configured to automatically activate a blocking mode in response to (i) a loss of synchronism between the first wheel and the second wheel or (ii) a loss of adhesion of either the first wheel or the second wheel, the blocking mode being a mode of the limited slip differential that transfers a majority of the driving torque to a slowest spinning wheel of the first wheel and the second wheel;
    a steering mechanism configured to manipulate the first wheel and the second wheel such that a steering angle of each of the first wheel and the second wheel is changed;
    an assist motor in communication with the steering mechanism; and
    a processor controlling the assist motor, the processor being configured to:
        determine an assist setpoint based on forces induced on the steering mechanism by the blocking mode of the limited slip differential,
        apply the determined assist setpoint to the assist motor such that the assist motor counteracts the forces induced on the steering mechanism,
        generate corrective anti-feedbacks that oppose disturbing force components caused by changes in the transfer of the majority of the driving torque between the first wheel and the second wheel, the generated corrective anti-feedbacks including a derivative component calculated by multiplying a value of a time derivative of a steering wheel torque exerted on the steering mechanism at a steering wheel by a derivative gain,
        generate return corrective components that, when the steering wheel is rotated so as to form a non-zero steering wheel angle relative to a central position corresponding to a straight-line trajectory, forces a return of the steering wheel to the central position, the generated return corrective components counteracting the disturbing force components, which reduce a self-aligning torque of the first and second wheels,
        determine and set a return setpoint by multiplying an angular deviation by an open-loop return gain, the angular deviation being defined as a difference between an instantaneous angular position of the steering wheel and a central angular position of the steering wheel, and
        define a return angular speed setpoint of the steering wheel, and adapt, in real time, the determined assist setpoint applied to the assist motor so that an actual return angular speed of the steering wheel follows the return angular speed setpoint of the steering wheel, wherein the return speed setpoint increases, in absolute value, with an angular deviation defined as the difference between the instantaneous angular position of the steering wheel and the central angular position of the steering wheel.

2. The system according to claim 1, wherein: the derivative gain increases when (i) the steering wheel torque exerted on the steering wheel, or (ii) an assist gradient, which represents a variation of an assist torque delivered by the assist motor, add to a corresponding variation of the steering wheel torque, or
    when the steering system includes a steering rack on which a longitudinal rack force is exerted, and when the rack force falls under a straight line threshold, that indicates that the vehicle follows a trajectory close to a straight line.

3. The system according to claim 1, wherein the corrective anti-feedbacks include a second adaptation function, according to which the derivative gain changes depending on a longitudinal speed of the vehicle, the corrective anti-feedbacks having a maximum which is located at a speed abscissa comprised between 35 km/h and 90 km/h.

4. The system according to claim 1, wherein an open-loop return gain is adjusted depending on a longitudinal speed of the vehicle, by a concave amplification function having a width at a half height that covers a speed range extending from a low value equal to or less than 15 km/h to a high value equal to or greater than 100 km/h.

5. The system according to claim 1, wherein a closed-loop return function involves a closed-loop return gain adjusted as a function of a longitudinal speed of the vehicle, and as a decreasing function of the steering wheel torque exerted on the steering wheel.

6. A front-wheel drive automotive vehicle or a vehicle having an integral transmission comprising a front running gear, the first wheel, the second wheel, and the power steering system according to claim 1 so as to provide a driver with a feeling of the front running gear devoid of the blocking mode.

7. The system according to claim 3, wherein the second adaptation function is concave and has at least one increasing domain between a y-intercept value corresponding to the value of the derivative gain at zero speed, a maximum, and a decreasing domain beyond the maximum.

* * * * *